Patented May 11, 1926.

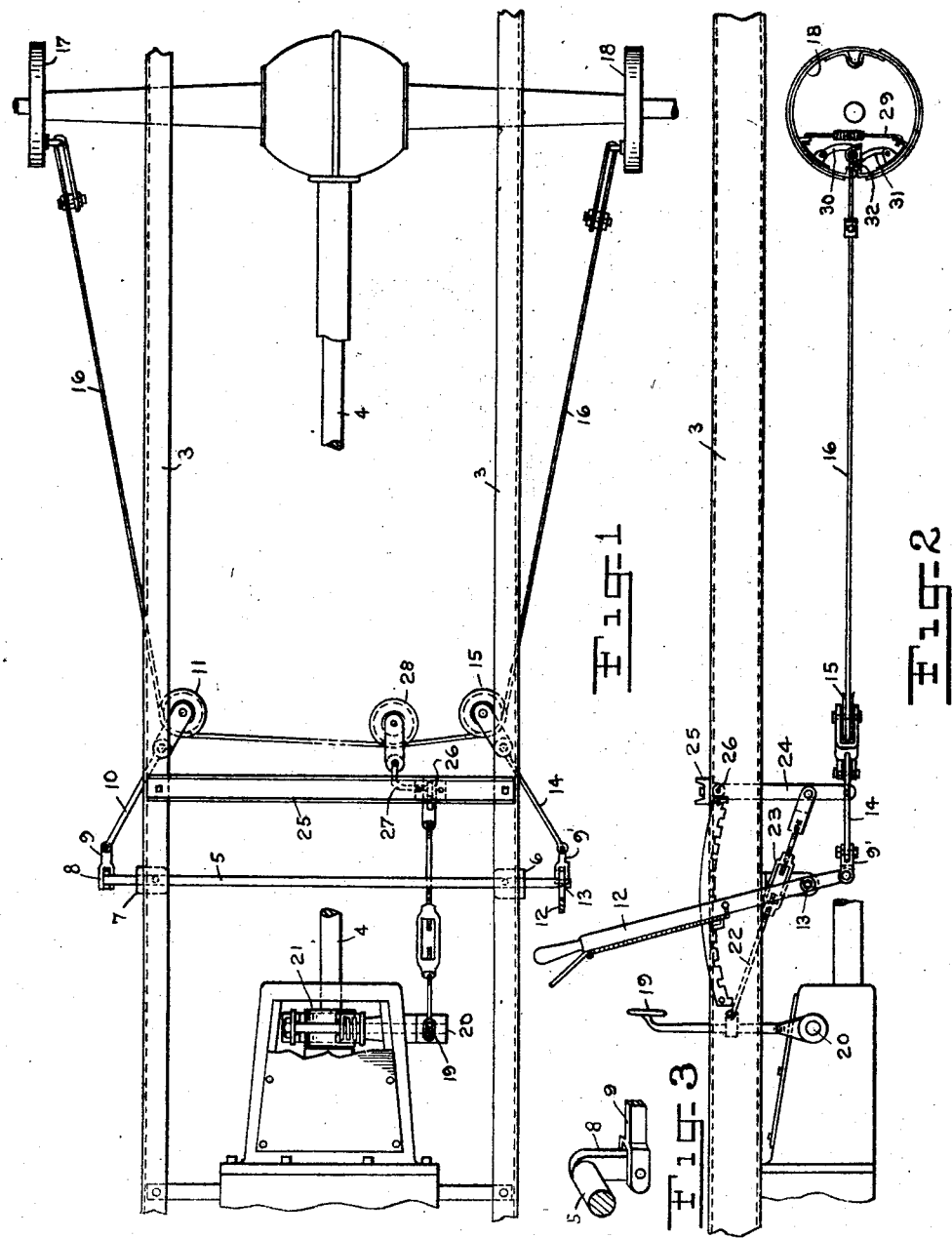

1,583,810

UNITED STATES PATENT OFFICE.

MELVIN STRINGER, OF POTTSTOWN, PENNSYLVANIA.

CABLE BRAKE MECHANISM.

Application filed September 9, 1925. Serial No. 55,247.

My invention relates to improvements in vehicle brake systems, and more particularly has reference to, and is illustrated in the accompanying drawings, in its application to a cable brake system for an automobile. One of the objects of my invention is to apply it in such manner that when used upon a vehicle having a propeller shaft brake, the same is operated simultaneously with the band brakes on the rear wheels, so that in the event of the propeller shaft brake mechanism getting out of order, the band brakes at the rear wheels are nevertheless applied through the same service brake mechanism without interference with the emergency brake connection, which may also be independently applied, so that even if both the propeller shaft and service brake connections to the rear wheels cease to operate, the emergency brake mechanism is still available.

In the accompanying drawings, I have illustrated in Fig. 1 in plan view, a suitable arrangement of cable brake mechanism, embodying an application of my invention. Fig. 2 is a side view looking upwardly at Fig. 1, and Fig. 3 is an enlarged detail in perspective of one of the cable connections.

3 indicates the chassis of the machine, and 4 the position of the propeller shaft thereof. 5 indicates a rotatable transverse rod mounted in the depending brackets 6—7 and having secured at one end a crank 8, upon the end of which is pivotally mounted the forked member 9, connected to rod 10 upon the end of which is pivotally mounted the grooved pulley 11. At the opposite side of the machine, the emergency lever 12 is pivotally mounted upon the shaft 5 as indicated at 13, the lower end carrying the forked member 9', pivotally mounted to the rod 14, at the other end of which is the grooved pulley 15. 16 indicates the cable which passes over the pulleys 11 and 15, the free ends being connected to the band brakes 17—18. From this it will be seen that upon the operation of the emergency lever 12, the band brakes on the rear wheels may be applied.

19 indicates the usual service brake pedal, pivotally mounted at 20, as shown, and adapted to operate the usual propeller shaft brake 21. Pivotally connected to the service brake pedal, however, is the rod 22 adjustable by turnbuckle 23, and pivotally connected with lever 24, which is pivotally mounted in the channel cross-bar 25, as indicated at 26. The lower end of this lever is connected to the rod 27 which is pivotally connected to the grooved pulley 28, around which the cable 16 also passes, so that when the service brake pedal is operated, the rear band brakes are applied in addition to the usual propeller shaft brake, and in case of the inoperativeness of one, the other will continue to operate, and in case of the inoperativeness of both the emergency brake will continue to operate, and likewise in case of the inoperativeness of the emergency brake, either or both the propeller shaft brake or service band brake connection will continue in operation. The particular type of band brake used in connection with this cable brake system is not material, but I have illustrated a preferred form of internal band brake, which I have found more efficient and uniform in wear than other forms. Referring to the same, shown in Fig. 2, the split ends of the band are normally drawn together by the spring 29, are normally separated by the links 30—31, pivotally connected to the member 32, one of said pivotal connections being slightly offset from the turning centre of said member 32, so that when operated, the pressure and wear are equalized and the braking effect is more equally distributed throughout the frictional surface of the band.

Of course it will be understood that various modifications may be made in the construction and arrangement of parts without departing from the spirit of the invention as claimed.

I claim:—

1. In a vehicle brake system of the class described, a cable having its free ends connected to the rear band brakes, pulleys upon said cable at opposite sides of the vehicle adapted to operate said cable when the emergency lever thereof is operated, and an intermediate pulley upon said cable adapted to operate said brakes when the emergency lever is operated.

2. In a vehicle brake system of the class described, a cable having its free ends connected to the rear band brakes, pulleys upon said cable at opposite sides of the vehicle adapted to operate said cable when the emergency lever thereof is operated, and an intermediate pulley upon said cable adapted to operate said brakes when the emergency lever is operated, said intermediate pulley operation of said brakes being adapted to be also operated when the propeller shaft brake is operated.

In testimony whereof I hereunto affix my signature.

MELVIN STRINGER.